United States Patent [19]

De Jonghe et al.

[11] Patent Number: 4,917,974
[45] Date of Patent: Apr. 17, 1990

[54] LITHIUM/ORGANOSULFUR REDOX CELL HAVING PROTECTIVE SOLID ELECTROLYTE BARRIER FORMED ON ANODE AND METHOD OF MAKING SAME

[75] Inventors: Lutgard C. De Jonghe; Steven J. Visco, both of Berkeley; Meilin Liu, Albany; all of Calif.; Catherine C. Mailhe, Vevey, Switzerland

[73] Assignee: The United States of America as represented by the Department of Energy, Washington, D.C.

[21] Appl. No.: 337,978

[22] Filed: Apr. 14, 1989

[51] Int. Cl.$^4$ .............................................. H01M 4/60
[52] U.S. Cl. .................... 429/104; 429/213; 29/623.5
[58] Field of Search .............. 429/104, 213, 50; 29/623.5

[56] References Cited

U.S. PATENT DOCUMENTS

| Re. 31,489 | 1/1984 | Sekido et al. | 429/191 |
|---|---|---|---|
| 3,957,533 | 5/1976 | Mess et al. | |
| 4,237,200 | 12/1980 | Weddiga | 429/102 |
| 4,317,874 | 3/1982 | Joshi et al. | 429/213 |
| 4,465,745 | 8/1984 | Akridge | 429/191 |
| 4,833,048 | 5/1989 | DeJonghe et al. | 429/104 |

Primary Examiner—Stephen J. Kalafut
Attorney, Agent, or Firm—L. E. Carnahan; Roger S. Gaither; William R. Moser

[57] ABSTRACT

A lithium/organosulfur redox cell is disclosed which comprises a solid lithium anode, a liquid organosulfur cathode, and a barrier layer formed adjacent a surface of the solid lithium anode facing the liquid organosulfur cathode consisting of a reaction product of the lithium anode with the organosulfur cathode. The organosulfur cathode comprises a material having the formula $(R(S)_y)_N$ where $y=1$ to 6, $n=2$ to 20 and R is one or more different aliphatic or aromatic organic moieties having 1 to 20 carbon atoms, which may include one or more oxygen, sulfur, nitrogen, or fluorine atoms associated with the chain when R comprises an aliphatic chain, wherein the linear chain may be linear or branched, saturated or unsaturated, and wherein either the aliphatic chain or the aromatic ring may have substituted groups thereon.

12 Claims, 3 Drawing Sheets

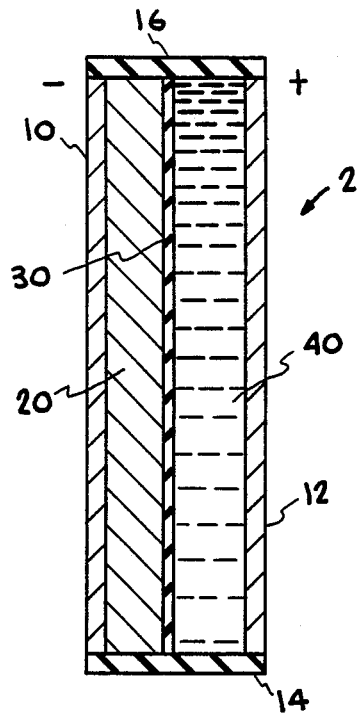
FIG. 1
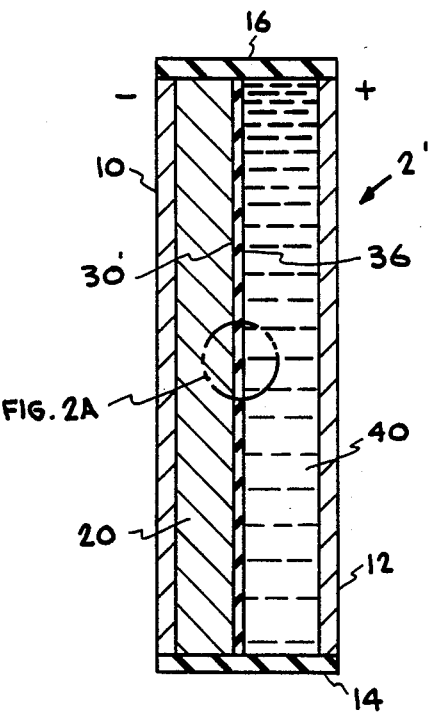
FIG. 2
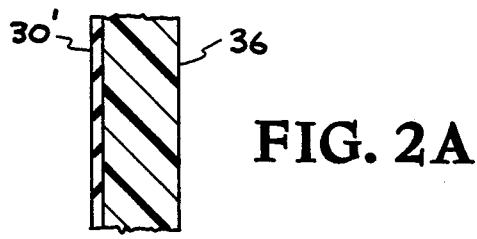
FIG. 2A
| PROVIDING A SOLID LITHIUM ANODE AND A LIQUID ORGANOSULFUR CATHODE CAPABLE OF FORMING A REDOX CELL |
|---|
| FORMING A BARRIER LAYER ADJACENT THE SURFACE OF THE SOLID LITHIUM ANODE FACING THE LIQUID ORGANOSULFUR CATHODE BY REACTING THE SOLID LITHIUM ANODE WITH THE LIQUID ORGANOSULFUR CATHODE |
FIG. 5

LITHIUM/ORGANOSULFUR REDOX CELL HAVING PROTECTIVE SOLID ELECTROLYTE BARRIER FORMED ON ANODE AND METHOD OF MAKING SAME

BACKGROUND OF THE INVENTION

The invention described herein arose in the course of, or under, Contract No. DE-AC03-76SF00098 between the United States Department of Energy and the University of California.

1. Field of the Invention

This invention relates to lithium/organosulfur redox cells and, more particularly, to a lithium/organosulfur redox cell capable of operating at room temperature and having a solid electrolyte barrier formed on the surface of the lithium anode.

2. Description of the Related Art

Considerable work has been under way to develop batteries that have excellent power to weight ratios. Alkali metal batteries have been under development and improvements in performance are being achieved. However, such batteries conventionally are operated at elevated temperatures using a liquid anode, e.g., liquid sodium, and using a special separator to achieve the necessary ion transport. These requirements, however, carry with them the need for operating temperatures higher than ambient, which increases the corrosion rate of the system, and the need to use a costly liquid anode containment component such as sodium beta alumina which also adds weight to the system.

Weddigen U.S. Pat. No. 4,237,200, for example, describes the use of a beta aluminum oxide ceramic material which acts to both contain the liquid metal anode as well as providing a solid electrolyte barrier separating the anode material from the cathode material.

Other forms of solid electrolyte barriers are also known. For example, Akridge U.S. Pat. No. 4,465,745 describes a solid state electrolyte which comprises various mole ratios of $SiS_2$ and $Li_2S$. The patentee states that lithium, silver, sodium, potassium, and rubidium anode materials may be used with the solid electrolyte while suitable cathode materials include poly (N-vinyl-pyrrolidone), PVP+iodine, PVP+iodine+$TiS_2$, $FeS_2$, $Sb_2S_3$, $TiS_2$, $MnO_2$, and organic charge transfer complexes with halogens.

It is also known to form such solid electrolyte barriers as coatings applied directly to a solid lithium anode. For example, Sekido et al Reissue U.S. Pat. No. 31,489 describe a lithium-iodine battery which comprises a lithium anode and a cathode containing a charge transfer complex of iodine and 1-normal-alkyl-pyridinium iodide. The anode surface may be coated with LiOH or $Li_3N$ to mitigate the internal self discharge of the cell during storage due to diffusion of iodine through the electrolyte layer. Mead et al U.S. Pat. No. 3,957,533 teaches a lithium-iodine battery wherein the lithium anode is coated with an organic electron donor material which preferably comprises 2-vinylpyridinium which may be brushed on the lithium anode surface as a solution of 2-vinylpyridinium dissolved in benzene.

Joshi et al U.S. Pat. No. 4,317,874 teaches the in situ formation of an electronic insulating layer of a material which functions as an electrolytic conductor to some degree which is formed when the cathode material comes into contact with the active metal anode which may comprise lithium, sodium, potassium or the like. The cathode material which, upon contact with the metal anode, forms this layer includes a charge transfer complex which may include one or more selected boron or phosphorus sulfide, oxide halide, or oxybromide compounds. The polymer in the charge transfer complexing agent is advantageously poly-2-vinyl pyridine.

Recently a new type of organic cathode material has been discovered, as described and claimed in De Jonghe et al U.S. Pat. No. 4,833,048, issued May 23, 1989 assigned to the assignee of this invention, which may comprise an organo-sulfur liquid, which permits the use of a solid lightweight anode material, such as lithium, to form a cell operable at room temperature. However, it is necessary to provide a barrier layer between the solid anode and the liquid organic cathode material to electronically insulate or separate the anode from the cathode material.

SUMMARY OF THE INVENTION

It is, therefore, an object of the invention to provide an improved lithium/organosulfur redox cell having a barrier layer formed on the surface of a solid lithium anode to electronically separate or insulate the anode from an organosulfur cathode material.

It is another object of the invention to provide an improved lithium/organosulfur redox cell having an electrolytically stable barrier layer formed on the surface of a solid lithium anode to electronically separate or insulate the anode from an organosulfur organic cathode material wherein the barrier layer is formed on the solid anode by immersing the solid anode in a solution of the organosulfur cathode material.

It is a further object of the invention to provide an improved lithium/organosulfur redox cell having a barrier layer formed on the surface of a solid lithium anode to electronically separate or insulate the anode from an organosulfur cathode material wherein the barrier layer is formed on the solid anode by separating the solid anode from a felt material containing the organosulfur cathode material by a porous separator which will allow the solid anode to form the protective barrier thereon by direct reaction with the organosulfur solution.

It is yet another object of the invention to provide a method for making a lithium/organosulfur redox cell with a protective barrier formed on the surface of a solid lithium anode.

These and other objects of the invention will be apparent from the following description and accompanying drawings.

BRIEF DESCRIPTION OF THE DRAWINGS

FIG. 1 is a vertical section view of one embodiment of the invention wherein the protective electrolyte barrier is formed on the surface of the solid lithium anode prior to complete assembly of the cell.

FIG. 2 is a vertical section view of another embodiment of the invention wherein the cell is assembled with a porous separator placed against the surface of the solid anode facing the organosulfur cathode to form the protective barrier by direct reaction between the solid lithium anode and the organosulfur solution.

FIG. 2A is an enlarged view of a portion of FIG. 2 showing the barrier layer formed at least on the surface of the porous separator.

FIG. 5 is a flow sheet illustrating the process of the invention.

DESCRIPTION OF THE PREFERRED EMBODIMENTS

Figure 3:
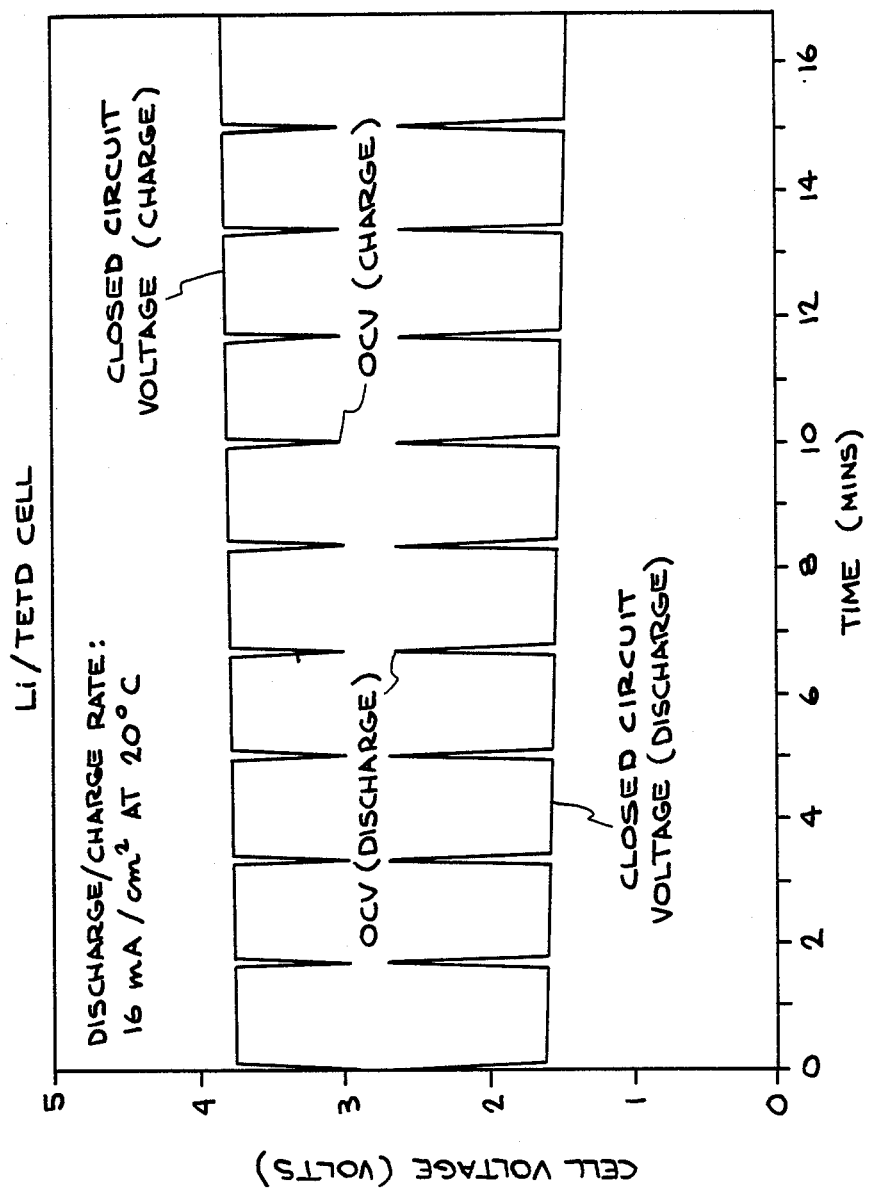
FIG. 3 is a graph showing the cell voltage during charge and discharge with respect to time of a cell constructed in accordance with the invention.

Referring now to FIG. 1, the lithium/organosulfur redox cell of the invention is generally shown at 2 in its simplest form comprising a solid lithium anode or negative electrode 20 and a liquid organosulfur-containing cathode or positive electrode 40. Interposed on the surface of anode 20 facing cathode 40 is an electrolyte barrier layer 30 as will be described in more detail below.

Anode 20, electrolyte barrier layer 30, and cathode 40 are shown disposed within a case which, in the simplified form of the illustrated embodiment, comprises a first metal sheet 10, which is in physical contact with anode 20, a second metal sheet 12 in physical contact with cathode 40, a first insulation cap 14 extending between one end of first metal sheet 10 and second metal sheet 12, and a second insulation cap 16 extending between the opposite ends of first sheet 10 and second sheet 12.

In this simplified embodiment, metal sheets 10 and 12 may function as both the containment walls of the redox cell and as the respective electrode contacts to the anode and cathode of the cell. The cell, while shown in planar form, may also be formed in a coil or jelly roll in which case a suitable insulator would be located between the two metal sheet current collector members, and electrode tabs or connectors could be attached to the ends or edges of respective metal sheets 10 and 12.

It will also be recognized that redox cell 2 may be one of a plurality of cells connected in series and/or parallel to form a battery in which instances casing materials 10, 12, 14, and 16 would be suitably modified as is well known to those skilled in this art.

Solid lithium anode 20 comprises a lithium or lithium base alloy metal capable of existing in solid form at the operating temperature of the cell, i.e., within a temperature range of between about $-40°$ C. to about $+150°$ C. Lithium base alloys (over 50 wt.% lithium), which may be used as the solid anode material include lithium-/aluminum alloys, lithium/silicon, alloys and lithium alloyed with any other metal capable of alloying with over 50 wt.% lithium to form an alloy in solid form within the temperature range of from about $-40°$ C. up to about $+150°$ C.

Organosulfur cathode 40 comprises the organosulfur cathode material described in DeJonghe et al U.S. Pat. No. 4,833,048, entitled METAL-SULFUR TYPE CELL HAVING IMPROVED ELECTRODE, cross-reference to which is hereby made. As described in more detail in that application, the organosulfur cathode may have the formula $(R(S)_y)_N$ where y=1 to 6, n=2 to 20, and R is one or more different aliphatic or aromatic organic moieties having 1 to 20 carbon atoms, which may include one or more oxygen, sulfur, nitrogen, or fluorine atoms associated with the chain when R comprises an aliphatic chain, wherein the linear chain may be linear or branched, saturated or unsaturated, and wherein either the aliphatic chain or the aromatic ring may have substituted groups thereon.

As also described in that application, the organosulfur active material may be dispersed in a graphite felt or the like which will act as a current distribution web or matrix.

In accordance with the invention, in order to form electrolyte barrier layer 30 of the embodiment shown in FIG. 1 barrier layer 30 may be formed on the surface of solid lithium anode 20, either prior to assembly of redox cell 2 or after assembly of the cell, by immersing anode 20 for from about 1 to about 3 minutes in a solution comprising the liquid organo-sulfur cathode material described in the aforementioned DeJonghe et al patent, at a temperature of from about 20° C. to about 60° C., to react the cathode material with the lithium anode to form the desired barrier layer resulting in formation of a dense layer of material on the surface of the lithium anode. Formation of this dense barrier layer on the surface of the solid lithium anode, in turn, blocks off any further reaction between the solid lithium anode and the liquid organo-sulfur cathode material discernible to the naked eye. Longer reaction times, of course, may be used but should be unnecessary.

Turning now to FIG. 2, another embodiment of the invention is generally shown at 2'. Like materials in this embodiment are shown with identical numerals. The principal difference in this embodiment is the provision of a porous separator 36 which is positioned against the face or surface of anode 20 which is in contact with, or at least facing, organosulfur cathode 40.

Porous separator 36 may comprise any generally electrolytically inert material having an average pore diameter sufficiently small to prevent penetration of the graphite fibers into the pores (which could short circuit the cell), yet sufficiently large to permit passage of the organosulfur solution into the pore therein and contact solid lithium anode 20 to form the desired barrier layer 30' by the in situ reaction between lithium anode 20 and the organosulfur material in the liquid cathode solution. An example of a material which may comprise porous separator 36 is Celgard 3401 Microporous Film having an average pore diameter of 0.02 microns.

This reaction is carried out by assembling the cell and injecting the organosulfur material into the cathode compartment at room temperature. Within a few minutes, as the dense barrier layer forms, the reaction stops due to the formation of the barrier layer which substantially has no holes through which further reactant can reach the anode.

The resulting barrier layer 30' material, as shown in exaggerated detail in the fragmentary magnified insert comprising FIG. 2A, comprises barrier material formed at least on the surface of lithium anode 20, thus providing an electronic barrier or separator between anode 20 and cathode 40, while allowing electrolytic communication or ionic migration through barrier 30'.

Figure 4:
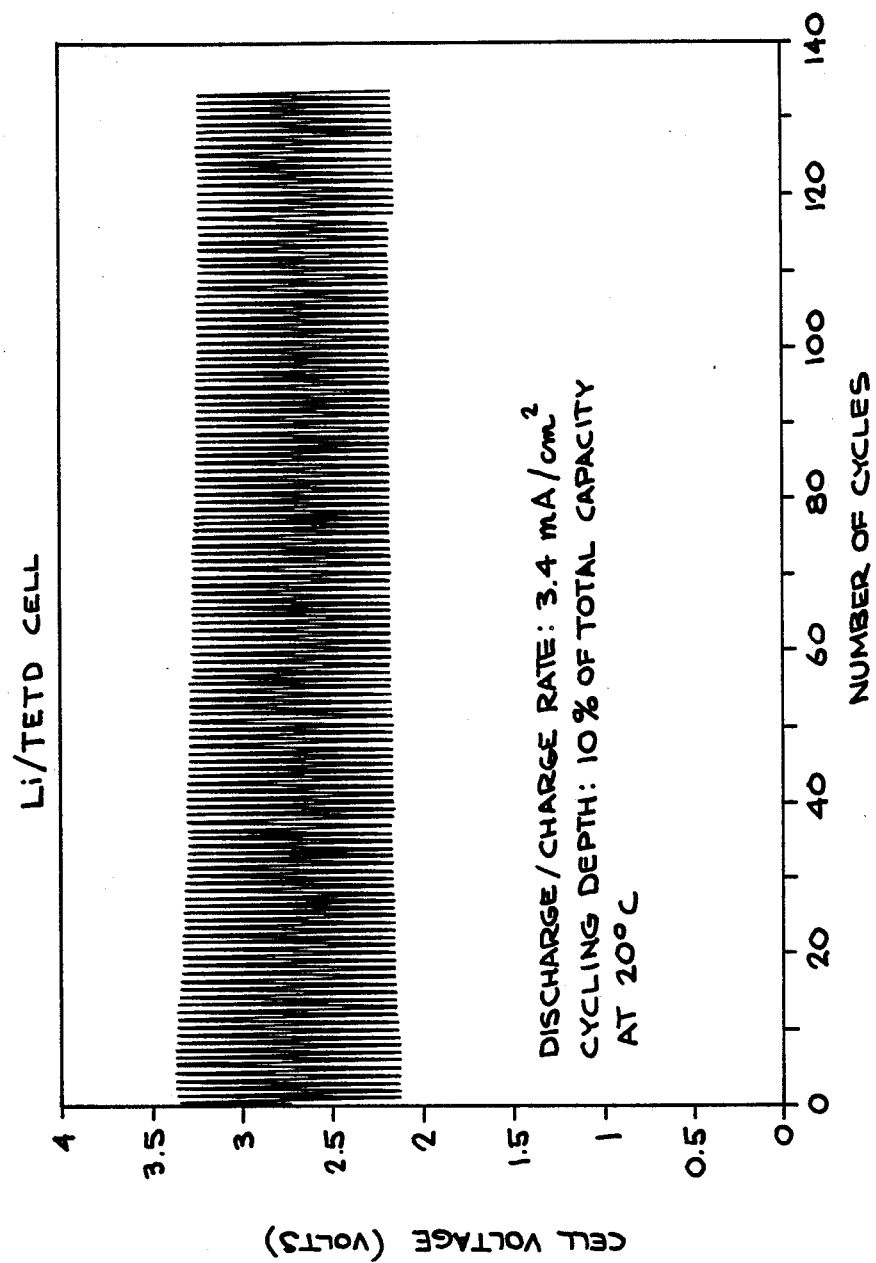
FIG. 4 is a graph showing the consistency of the charge/discharge performance of a cell constructed in accordance with the invention after a number of charge/discharge cycles.

To further illustrate the invention, lithium/organosulfur cells were constructed having solid lithium anodes and liquid cathodes of tetraethylthiuram disulfide (TETD) dissolved in dimethylsulfoxide with Celgard 3401 microporous film separators on the surface of the lithium anode facing the liquid cathode to form the barrier layer in situ on the outer surface of anode 20. The cells were constructed and then tested at room temperature, i.e., about 20° C., to determine the open and closed circuit voltages during both charging and discharging cycles when charged and discharged at a rate of 16 milliamps/cm² at 20° C. As shown in FIG. 3, the open and closed circuit voltages, as well as the open circuit voltages are shown to be fairly consistent with time, indicating the quality and durability of the barrier layer. FIG. 4 further illustrates the consistency of the voltage peaks during both charge and discharge over a number of cycles.

Thus, the invention provides a novel lithium/organosulfur cell having an electronic barrier layer formed directly on the solid lithium anode surface facing the liquid organosulfur cathode using the solid lithium anode as a reactant in the formation of the barrier layer.

While specific embodiments of the lithium/organosulfur cell of the invention and methods of making same have been illustrated and described, modifications and changes of the structure, or the methods, including parameters, materials, etc. will become apparent to those skilled in the art, and it is intended to cover in the appended claims all such modifications and changes which come within the scope of the invention.

What is claimed is:

1. A solid lithium-organosulfur redox cell comprising:
   (a) a solid lithium anode formed from a material selected from the class consisting of elemental lithium and one or more lithium base alloys comprising over 50 wt.% lithium or mixtures thereof;
   (b) a liquid organosulfur cathode having the formula of $(R(S)_Y)_N$ where $y=1$ to 6, $n=2$ to 20, and R is one or more different aliphatic or aromatic organic moieties having 1 to 20 carbon atoms, which may include one or more oxygen, sulfur, nitrogen, or fluorine atoms associated with the chain when R comprises an aliphatic chain, wherein the linear chain may be linear or branched, saturated or unsaturated, and wherein either the aliphatic chain or the aromatic ring may have substituted groups thereon; and
   (c) a barrier layer formed adjacent a surface of said solid lithium anode consisting of a reaction product of said solid lithium anode with said liquid organosulfur cathode.

2. The redox cell of claim 1 wherein said liquid organosulfur cathode is dispersed in a felt material in said cell.

3. The cell of claim 1 wherein said barrier layer is the reaction product formed after immersing said alkali metal anode in a solution containing said organosulfur cathode material.

4. The cell of claim 1 wherein said redox cell is further provided with a porous member separator positioned between said lithium anode and said organosulfur cathode and against a surface of said anode; and said barrier layer is formed by contacting said surface of said metal anode with said organosulfur cathode material through the pores of said porous member.

5. A lithium/organosulfur redox cell capable of operating at ambient temperatures comprising:
   (a) a solid lithium anode formed from a material selected from the class consisting of elemental lithium and one or more lithium base alloys or mixtures thereof;
   (b) a liquid organosulfur cathode having the formula of $(R(S)_Y)_N$ where $y=1$ to 6, $n=2$ to 20, and R is one or more different aliphatic or aromatic organic moieties having 1 to 20 carbon atoms, which may include one or more oxygen, sulfur, nitrogen, or fluorine atoms associated with the chain when R comprises an aliphatic chain, wherein the linear chain may be linear or branched, saturated or unsaturated, and wherein either the aliphatic chain or the aromatic ring may have substituted groups thereon; and
   (c) a barrier layer formed adjacent a surface of said solid lithium anode consisting of a reaction product of said solid lithium anode with said liquid organosulfur cathode.

6. The cell of claim 5 wherein said redox cell also contains a porous separator adjacent said surface of said solid lithium anode facing said liquid organosulfur cathode.

7. A method of forming a lithium/organosulfur redox cell having a solid lithium anode and a liquid organosulfur cathode with a barrier layer formed adjacent a surface of said anode facing said cathode which comprises:
   (a) providing a solid lithium anode formed from a material selected from the class consisting of elemental lithium and one or more lithium base alloys comprising over 50 wt.% lithium or mixtures thereof;
   (b) providing a liquid organosulfur cathode having the formula $(R(S)_Y)_N$ where $y=1$ to 6, $n=2$ to 20, and R is one or more different aliphatic or aromatic organic moieties having 1 to 20 carbon atoms, which may include one or more oxygen, sulfur, nitrogen, or fluorine atoms associated with the chain when R comprises an aliphatic chain, wherein the linear chain may be linear or branched, saturated or unsaturated, and wherein either the aliphatic chain or the aromatic ring may have substituted groups thereon; and
   (c) contacting said solid lithium anode with said liquid organosulfur cathode to form a barrier layer adjacent a surface of said solid lithium anode facing said liquid organosulfur cathode.

8. The method of claim 7 wherein said contacting step further comprises contacting said lithium anode with said liquid organosulfur cathode for a period of from about 1 to about 3 minutes while maintaining said anode within a temperature range of from about 20° C. to about 60° C.

9. The method of claim 7 including the further step of providing a porous separator adjacent said surface of said solid lithium anode facing said liquid organosulfur cathode and said step of reacting said lithium anode with said liquid organosulfur cathode material further comprises reacting said lithium anode with said liquid organosulfur cathode through said porous separator to form said barrier.

10. The method of claim 7 wherein said step of contacting said lithium anode with said liquid organosulfur cathode further comprises contacting said lithium anode with said liquid organosulfur cathode to form said barrier layer adjacent the surface of said anode prior to assembling said anode and cathode into a cell.

11. The method of claim 7 wherein said step of contacting said lithium anode with said liquid organosulfur cathode further comprises contacting said lithium anode with said liquid organosulfur cathode to form said barrier layer adjacent the surface to said anode after assembling said anode and cathode into a cell.

12. The method of claim 7 wherein said step of providing a liquid organosulfur cathode further comprises providing said liquid organosulfur cathode dispersed in a felt material.

* * * * *